United States Patent
Weichlein

(10) Patent No.: US 11,316,654 B2
(45) Date of Patent: Apr. 26, 2022

(54) COMMUNICATION DEVICE AND METHOD FOR OPERATING A COMMUNICATION SYSTEM FOR TRANSMITTING TIME CRITICAL DATA

(71) Applicant: Siemens Aktiengesellschaft, Munich (DE)

(72) Inventor: Thomas Weichlein, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/418,396

(22) PCT Filed: Dec. 13, 2019

(86) PCT No.: PCT/EP2019/085098
§ 371 (c)(1),
(2) Date: Jun. 25, 2021

(87) PCT Pub. No.: WO2020/136022
PCT Pub. Date: Jul. 2, 2020

(65) Prior Publication Data
US 2022/0045835 A1    Feb. 10, 2022

(30) Foreign Application Priority Data
Dec. 28, 2018  (EP) .................................... 18248171

(51) Int. Cl.
*H04L 7/00*     (2006.01)
*H04L 47/24*   (2022.01)
(Continued)

(52) U.S. Cl.
CPC ........ *H04L 7/0008* (2013.01); *G05B 19/4185* (2013.01); *H04L 47/24* (2013.01);
(Continued)

(58) Field of Classification Search
CPC ....... H04L 7/0008; H04L 47/24; H04L 47/28; H04L 47/827; G05B 19/4185
See application file for complete search history.

(56) References Cited

U.S. PATENT DOCUMENTS 6,477,181 B1   11/2002 Fujimori et al.
2012/0120966 A1  5/2012 Balasubramanian et al.
(Continued)

FOREIGN PATENT DOCUMENTS

CN    102571556    7/2012
CN    103580769    2/2014
(Continued)

OTHER PUBLICATIONS

International Search Report dated Mar. 24, 2020 based on PCT/EP2019/085098 filed Dec. 13, 2019.
(Continued)

*Primary Examiner* — Siming Liu
(74) *Attorney, Agent, or Firm* — Cozen O'Connor

(57) ABSTRACT

A communication device and method for operating a communication system for transmitting time-critical data, wherein a respective individual time window within predefined time intervals is specified for data flows assigned to selected control applications running on terminals, where time windows each have an individual cycle time that is a multiple of a general cycle time or corresponds to the general cycle time, first and second communication devices each check, for the selected control applications, whether a specified time window is available for data transmission, where information about a beginning of the time window within the predefined time intervals is in each case transmitted to the terminal upon which the respective selected control application is executing in the event of an available time window, and where data flows that are assigned to selected control applications are each transmitted according
(Continued)

to the information about the beginning of the individual time window.

16 Claims, 3 Drawing Sheets

(51) Int. Cl.
  *H04L 47/70* (2022.01)
  *G05B 19/418* (2006.01)
  *H04L 47/28* (2022.01)
(52) U.S. Cl.
  CPC ............ *H04L 47/28* (2013.01); *H04L 47/827* (2013.01); *G05B 2219/31115* (2013.01)

(56) References Cited

U.S. PATENT DOCUMENTS

| | | | |
|---|---|---|---|
| 2014/0029633 | A1 | 1/2014 | Hamamatsu et al. |
| 2015/0103831 | A1 | 4/2015 | Chandhoke et al. |
| 2015/0103848 | A1 | 4/2015 | Chandhoke et al. |
| 2016/0182394 | A1 | 6/2016 | Kiessling |
| 2019/0245805 | A1* | 8/2019 | Sakic ...................... H04L 41/12 |
| 2019/0327181 | A1* | 10/2019 | Dilger ................... H04L 45/123 |

FOREIGN PATENT DOCUMENTS

| | | |
|---|---|---|
| CN | 103905328 | 7/2014 |
| CN | 105721335 | 6/2016 |
| CN | 105814840 | 7/2016 |
| EP | 1553732 A2 | 7/2005 |
| EP | 3038325 | 6/2016 |
| WO | 2018059690 | 4/2018 |
| WO | 2018121864 | 7/2018 |
| WO | 2019001718 | 1/2019 |

OTHER PUBLICATIONS

Office Action dated Nov. 15, 2021 issued in Chinese Patent Application No. 201980086665.X.

* cited by examiner

COMMUNICATION DEVICE AND METHOD FOR OPERATING A COMMUNICATION SYSTEM FOR TRANSMITTING TIME CRITICAL DATA

CROSS-REFERENCE TO RELATED APPLICATIONS

This is a U.S. national stage of application No. PCT/EP2019/085098 filed 13 Dec. 2019. Priority is claimed on European Application No. 18248171.3 filed 28 Dec. 2018, the content of which is incorporated herein by reference in its entirety.

BACKGROUND OF THE INVENTION

1. Field of the Invention

The invention relates to industrial automation systems and, more particularly, to a communication device and method for operating a communication system for transmitting time-critical data.

2. Description of the Related Art

Typically, an industrial automation system comprises a multiplicity of automation devices networked to one another via an industrial communication network and is used for controlling or regulating installations, machines or devices within the context of a production or process automation. Time-critical constraints in industrial automation systems mean that predominantly realtime communication protocols, such as PROFINET, PROFIBUS, realtime Ethernet or time-sensitive networking (TSN), are used for communication between automation devices.

Interruptions to communication connections between computer units of an industrial automation system or automation devices can lead to undesirable or unnecessary repetition of a transmission of a service request. Additionally, messages that are not transmitted or not transmitted completely can prevent an industrial automation system from changing to or remaining in a safe operating state, for example. This can finally lead to failure of a complete production installation and to costly production downtime. One particular problem area in industrial automation systems regularly results from message traffic that contains relatively many but relatively short messages, which intensifies the above-described problems.

Use for often extremely different applications can create problems in Ethernet-based communication networks, for example, if network resources are used for transmitting data streams or data frames with realtime demands in competition with transmitting data frames having a large payload content without specific quality of service demands. This can lead to data streams or data frames with realtime demands not being transmitted in accordance with a demanded or required quality of service.

Prioritized transmission of data frames is fundamentally possible, for example, based on virtual local area networks (VLANs) in accordance with Institute of Electrical and Electronics Engineers (IEEE) standard 802.1Q, via appropriate tags inserted in data frames. For the purpose of synchronized and prioritized transfer of audio and video data streams (audio/video bridging) via communication networks, there is provision for bandwidth reservation for individual communication connections that have a highest assigned priority. Here, resources required for transferring audio and video data streams are reserved in communication devices, such as switches. However, high-priority data frames are forwarded only after a successful reservation. Bandwidth monitoring is used to ensure that there is sufficient reserved bandwidth available with respect to bandwidth that is actually used. A communication connection that uses more bandwidth than is reserved would otherwise lead to a disturbance on an entire communication network, in the worst case to the communication network being brought to a standstill on account of overload.

For the secure transfer of audio and video data streams via Ethernet-based communication networks, credit-based shapers (CBSs) have been defined in accordance with IEEE standard 802.1Qav as a measure of bandwidth monitoring. Credit-based shapers define a transfer pause after each transferred data frame to ensure bandwidth limiting with reference to a reserved bandwidth. However, such enforced pauses are extremely problematic in industrial automation systems when transferring many data frames having little payload content for control data, which are more likely to be regarded as data bundles or bursts.

In accordance with EP 3 038 325 A1, data transmission in a communication network of an industrial automation system is accomplished by virtue of coupling communication devices of the communication network transmitting first data frames comprising control data for the automation system only within periodic first-time intervals. Second data frames assigned to data streams comprising sequences of data frames, or third data frames, for the transmission of which there is no stipulated quality of service or a stipulated quality of service below a predefined threshold value, are transmitted within periodic second time intervals. The first-time intervals are divided into first and second subintervals. First data frames to be forwarded are added to a first or second queue in alternate subintervals and taken from the queues alternately for forwarding.

WO 2019/001718 A1 describes a method for data transmission that allows a combination of protected communication and low network configuration complexity. Here, reservation of resources for transmitting data streams from a transmitter to a receiver involves at least two paths that are redundant at least in sections being reserved. By extending a reservation protocol, automatic configuration of duplicate filters at network nodes assigned to redundant path sections is performed during a resource reservation.

WO 2018/121864 A1 discloses a method for operating a communication network comprising multiple communication devices in an industrial automation system, in which at least one control unit controls functions of multiple assigned communication devices and is assigned to at least one partition of the communication network. Partitions comprise, in each particular case, predefinable proportions of system resources of assigned communication devices for predefinable resource usage durations. Access periods and repetition cycles for transmit queues are set by the control unit in accordance with the resource usage durations for the partitions in the assigned communication devices. For the path reservation requests, possible partitions are determined based on matching classifications of access periods and repetition cycles. If there are sufficient system resources, the respective path reservation request is assigned to a determined partition. The method described in WO 2018/121864 A1 is not geared to evenly distributing time windows for cyclic data traffic in order to use available resources more efficiently, however.

WO 2018/059690 A1 relates to a method for operating a communication network comprising multiple communication devices in an industrial automation system, in which multiple control units control functions of multiple assigned communication devices in each particular case. For each control unit, a predefinable proportion of system resources of an assigned communication device is made available for a predefinable resource usage duration. The control units synchronously capture state variables of the communication devices when predefinable synchronization events occur and compare the state variables against one another. Moreover, the control units determine, for at least one past resource usage duration, which quality measure changes result for communication network paths to be determined based on a determination time available for path determination, and determine a first correction value for the synchronization events based on the quality measure changes. When comparing the state variables against one another, the control units determine a second correction value for the synchronization events on the basis of inconsistent state variables. The method described in WO 2018/059690 A1 is likewise not geared to evenly distributing time windows for cyclic data traffic in order to use available resources more efficiently.

SUMMARY OF THE INVENTION

IN view of the foregoing, it is an object of the present invention to provide an apparatus and method for operating a communication system for transmitting time-critical data that allows both efficient utilization of available system resources and flexible adaptation for individual demands of control applications.

This and other objects and advantages are achieved in accordance with the invention by a communication device and method for operating a communication system for transmitting time-critical data, in which selected datagrams are transmitted from first communication devices at source network nodes to second communication devices at destination network nodes within predefined periodic time intervals. The selected datagrams are assigned to data streams and are transmitted via paths that comprise third communication devices at intermediate network nodes. The predefined time intervals are synchronized at all network nodes. To reserve resources that are to be provided by the first, second and third communication devices, terminals connected to the first communication devices specify, in each particular case, quality of service parameters for the data streams. By contrast, terminals connected to the second communication devices specify, in each particular case, a data stream identifier for a reservation request.

In accordance with the invention, each communication device along a path for a data stream takes the quality of service parameters as a basis for checking, in each particular case, in the event of a reservation request, whether there are sufficient resources available in the respective communication device for data transmission while observing the specified quality of service parameters. Reservation requests are preferably handled in accordance with IEEE 802.1Qcc. The resources to be provided by the communication devices comprise, for example, usable transfer time windows, bandwidth, assured maximum latency, number of queues, queue cache or address cache in switches or bridges. The paths for the data streams are advantageously ascertained via shortest path bridging in accordance with IEEE 802.1aq.

In accordance with the invention, if there are sufficient resources then configuration control units of the communication devices along a path ascertain, in each particular case, configuration information for a data stream and set up the respective communication device for resource provision for the data streams in accordance with the ascertained configuration information. Preferably, if there are sufficient resources then a multicast address assigned to the specified data stream identifier is transmitted, in each particular case, to a requesting terminal connected to a destination network node.

In accordance with the invention, an individual time window within the predefined time intervals is specified, in each particular case, for data streams assigned to selected control applications running on terminals. The time windows have, in each particular case, an individual cycle duration that is a multiple of a general cycle duration or corresponds to the general cycle duration. The first and second communication devices check, in each particular case, for the selected control applications whether a specified time window is available for data transmission. If a time window is available then information about a beginning of the time window is transmitted, in each particular case, within the predefined time intervals to the terminal upon which the respective selected control application runs or executes. Data streams assigned to selected control applications are transmitted, in each particular case, in accordance with the information about the beginning of the individual time window. This allows time windows for cyclic data traffic to be evenly distributed and available resources to be used efficiently. In particular, starting times for data traffic having a longer cycle duration can be moved to phases that are not used by data traffic having a short cycle duration for this purpose.

The communication devices are preferably connected to one another via a time-sensitive network, in particular in accordance with IEEE 802.1Q, IEEE 802.1AB, IEEE 802.1AS, IEEE 802.1BA and/or IEEE 802.1CB. Forwarding of the selected datagrams can be controlled, for example, via frame pre-emption, in particular in accordance with IEEE 802.1Qbu, time-aware shapers, in particular in accordance with IEEE 802.1Qbv, credit-based shapers, in particular in accordance with IEEE 802.1Qav, burst limiting shapers, peristaltic shapers and/or priority-based shapers.

The communication device in accordance with the invention is intended to implement the method in accordance with the above-described explanations and has multiple connections for connection to further communication devices and also a coupling element via that the connections are switchably connectable to one another. The communication device is configured to transmit selected datagrams from first communication devices at source network nodes to second communication devices at destination network nodes within predefined periodic time intervals, the selected datagrams being assigned to data streams and being transmitted via paths that comprise third communication devices at intermediate network nodes. Moreover, the communication device is designed and set up to synchronize the predefined time intervals with other network nodes and to take quality of service parameters specified for a data stream as a basis for checking, in the event of a reservation request, whether there are sufficient resources available in the communication device for data transmission while observing the specified quality of service parameters.

Furthermore, the communication device in accordance with the invention is configured to use a configuration control unit to ascertain configuration information and to set itself up for resource provision for the data streams in accordance with the ascertained configuration information. In addition, the communication device is configured to check, in each particular case, for selected control applications whether a specified time window is available for data transmission. An individual time window within the predefined time intervals is specifiable, in each particular case, for data streams assigned to selected control applications running on terminals, the time windows having, in each particular case, an individual cycle duration that is a multiple of a general cycle duration or corresponds to the general cycle duration.

Furthermore, the communication device in accordance with the invention is configured so as, if a time window is available, to transmit, in each particular case, information about a beginning of the time window within the predefined time intervals to the terminal on which the respective selected control application runs, and to transmit, in each particular case, data streams assigned to selected control applications in accordance with the information about the beginning of the individual time window.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE EXEMPLARY EMBODIMENTS

Figure 1:
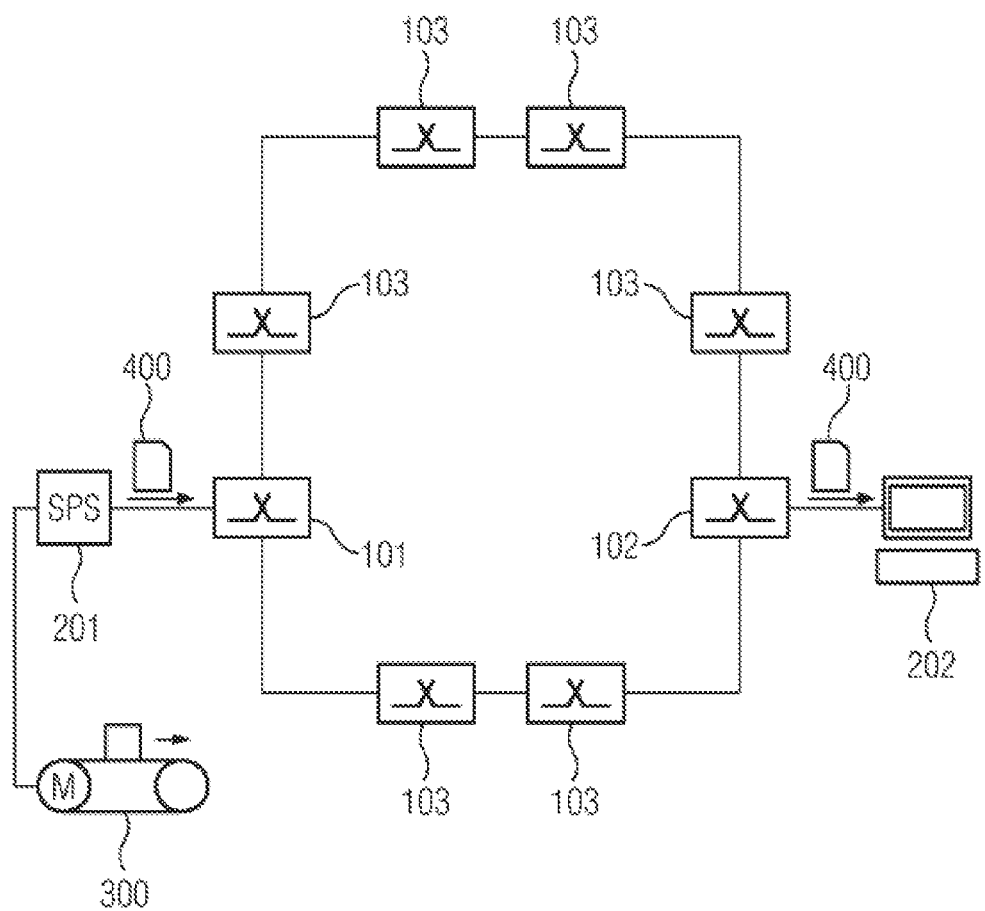
FIG. 1 shows a communication system comprising multiple communication devices for an industrial automation system in accordance with the invention.

The communication system for an industrial automation system depicted in FIG. 1 comprises multiple communication devices 101, 102, 103. The communication devices 101, 102, 103 can be bridges, switches or routers, for example, and used for connecting programmable logic controllers 201, input/output units (I/O modules) or operating and observation stations 202 of the industrial automation system. In the present exemplary embodiment, the communication network comprising the communication devices 101-103 is designed as a time-sensitive network, in particular in accordance with IEEE 802.1Q, IEEE 802.1AB, IEEE 802.1AS, IEEE 802.1BA or IEEE 802.1CB.

Programmable logic controllers 201 typically comprise, in each particular case, a communication module, a central unit and at least one input/output unit. Input/output units can fundamentally also be formed as local peripheral modules that are arranged remotely from a programmable logic controller. The communication module connects a programmable logic controller 201, for example, to a switch or router or additionally to a fieldbus. The input/output unit is used for interchanging control and measured variables between the programmable logic controller 201 and a machine or apparatus 300 controlled by the programmable logic controller 201. The central processing unit is provided in particular for ascertaining suitable control variables from captured measured variables. The above components of the programmable logic controller 201 are connected to one another via a backplane bus system in the present exemplary embodiment.

An operating and observation station 202 is used for visually displaying process data or measured and control variables that are processed or captured by programmable logic controllers, input/output units or sensors. In particular, an operating and observation station 202 is used for displaying values of a control loop and for altering control parameters. Operating and observation stations 202 comprise at least a graphical user interface, an input device, a processor unit and a communication module.

First automation devices, which are communication terminals connected to source network nodes and have a talker function, are used to provide information or services for use to second automation devices, which are communication terminals connected to destination network nodes and have a listener function, by way of multicast data streams. An automation device can simultaneously have both a talker function and a listener function, for example, if it firstly provides automation services and secondly uses automation services of other devices.

In the present exemplary embodiment, the programmable logic controller 201 has a talker function, whereas the operating and observation station 202 has a listener function and in particular receives information provided by the programmable logic controller 201. Fundamentally, the operating and observation station 202 could analyze information received from the programmable logic controller 201 and predefine control parameters for the programmable logic controller 201 therefrom. Both the programmable logic controller 201 and the operating and observation station would therefore perform both functions. To simplify illustration, it is assumed below that both devices have only one assigned function in each particular case.

Figure 2:
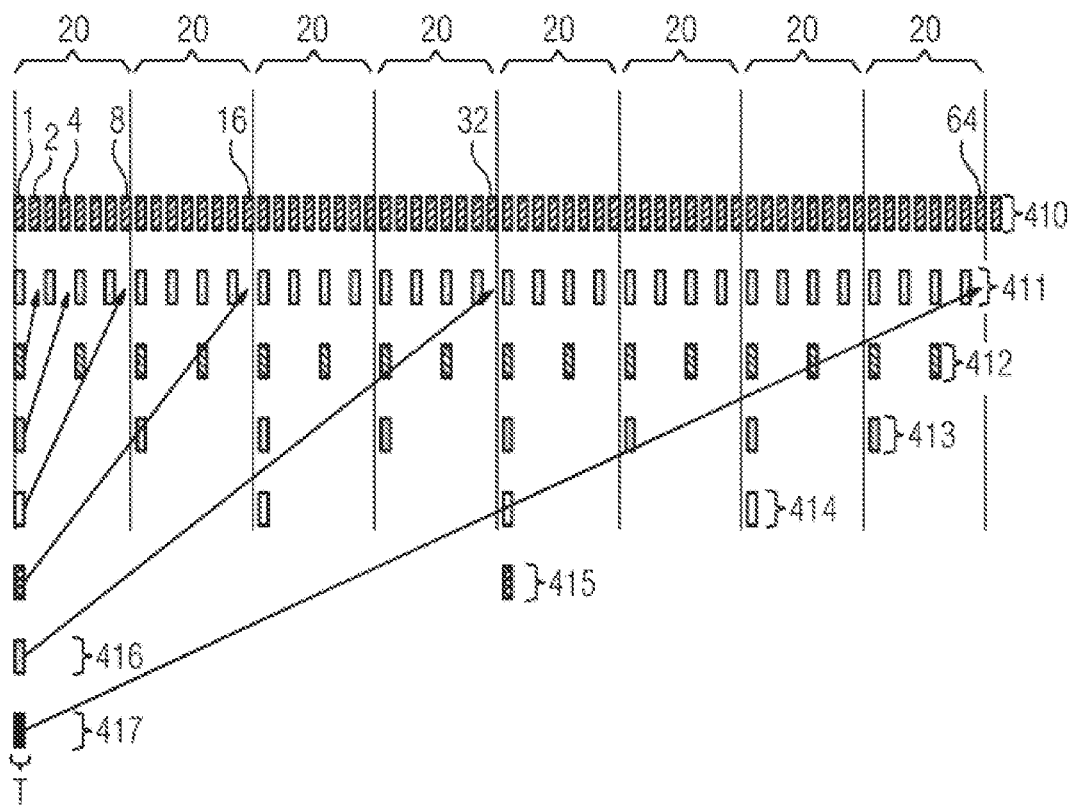
FIG. 2 shows a schematic depiction of a distribution of individual time windows for control applications within a general cycle for periodically transmitted data frames.

Datagrams 400 selected in the present exemplary embodiment are transmitted as multicast data streams from first communication devices 101 at source network nodes to second communication devices 102 at destination network nodes via third communication devices 103 at intermediate network nodes within predefined periodic time intervals 20 (see also FIG. 2). The predefined time intervals 20 are synchronized at all network nodes, in this case. Forwarding of the selected datagrams can in particular be controlled via frame pre-emption in accordance with IEEE 802.1Qbu, time-aware shapers in accordance with IEEE 802.1Qbv, credit-based shapers in accordance with IEEE 802.1Qav, burst limiting shapers, peristaltic shapers or priority-based shapers.

Terminals connected to the first communication devices 101, for example, the programmable logic controller 201, specify, in each respective case, quality of service parameters for the data streams during a data stream registration in order to reserve resources to be provided by the first, second and third communication devices 101, 102, 103. The resources to be provided by the first second, and third communication devices 101, 102, 103 comprise, for example, usable transfer time windows, bandwidth, assured maximum latency, number of queues, queue cache or address cache in switches or bridges. If data stream registration is successful or specified quality of service demands can fundamentally be met, a data stream identifier is assigned in each respective case. Terminals connected to the second communication devices 102, for example, the operating and observation station 202, specify a respective data stream identifier for a reservation request. In the present exemplary embodiment, the reservation requests are handled in accordance with IEEE 802.1Qcc. Furthermore, data streams are preferably set up, in each particular case, bidirectionally upon reservation requests.

In accordance with a local approach to reserving resources for transmitting data streams, each communication device 101, 102, 103 along a path for a data stream takes the quality of service parameters as a basis for checking, in each particular case, in the event of a reservation request, whether there are sufficient resources available in the respective communication device for data transmission while observing the specified quality of service parameters. A central entity for resource management or path ascertainment is not necessary with the local approach for resource reservation for data streams. The paths for the data streams can be ascertained via shortest path bridging in accordance with IEEE 802.1aq, for example. If there are sufficient resources then a multicast address assigned to the specified data stream identifier is transmitted, in each respective case, to a requesting terminal connected to a destination network node. Moreover, if there are sufficient resources then configuration control units of the communication devices along a path ascertain, in each particular case, configuration information for a data stream and set up the respective communication device for resource provision for the data streams in accordance with the ascertained configuration information.

In accordance with FIG. 2, the periodic time intervals 20 for data streams assigned to selected control applications running on terminals are overlaid, in each particular case, with individual application-specific time windows 411-417 that form a subset of a sequence of time windows 410 available in total and, in the present exemplary embodiment, have a standard duration T. The application-specific time windows 411-417 each have an individual cycle duration that is a multiple of a general cycle duration, which is 1 ms in the present exemplary embodiment. Fundamentally, the respective individual cycle duration can also correspond to the general cycle duration. By way of illustration, FIG. 2 depicts:

first application-specific time windows 411 with a cycle duration of 2 ms,
second application-specific time windows 412 with a cycle duration of 4 ms,
third application-specific time windows 413 with a cycle duration of 8 ms,
fourth application-specific time windows 414 with a cycle duration of 16 ms,
fifth application-specific time windows 415 with a cycle duration of 32 ms,
sixth application-specific time windows 416 with a cycle duration of 64 ms, and
seventh application-specific time windows 417 with a cycle duration of 128 ms.

The first and second communication devices 101, 102, check for locally assigned selected control applications, whether a respective specified application-specific time window 411-417 is available for data transmission. If a suitable time window is available, then the beginning thereof is initially ascertained, in each particular case, within the sequence of time windows 410 available in total and information about the beginning of the time window is transmitted to the terminal upon which the respective selected control application runs or executes. This means that data streams assigned to selected control applications are transmitted, in each particular case, in accordance with the information about the beginning of the individual time window. Advantageously, the first and second communication devices 101, 102, to each of which is connected a terminal upon which a selected control application runs or executes, check, in each particular case, whether a specified application-specific time window 411-417 is available for data transmission.

In accordance with FIG. 2, the respective beginning of the application-specific time windows 411-417 is moved, as indicated by arrows, such that a substantially closed sequence of time windows is produced. The aforementioned synchronization of all network nodes to the periodic time intervals 20 with the general cycle duration means that the time windows have identical window positions at all network nodes. The first and second communication devices 101, 102 can therefore ascertain the beginning of the respective application-specific time windows 411-417 independently of other first, second or third communication devices 101-103.

In the present exemplary embodiment, the beginning of the application-specific time windows 411-417 is placed at the following window positions, depending on the cycle duration of said time windows:

at window position 1 for first application-specific time windows 411,
at window position 2 for second application-specific time windows 412,
at window position 4 for third application-specific time windows 413,
at window position 8 for fourth application-specific time windows 414,
at window position 16 for fifth application-specific time windows 415,
at window position 32 for sixth application-specific time windows 416, and
at window position 64 for seventh application-specific time windows 417.

In sum, the beginning of application-specific time windows having a longer cycle duration can be moved such that a distributed, more homogeneous network loading is achieved.

Figure 3:
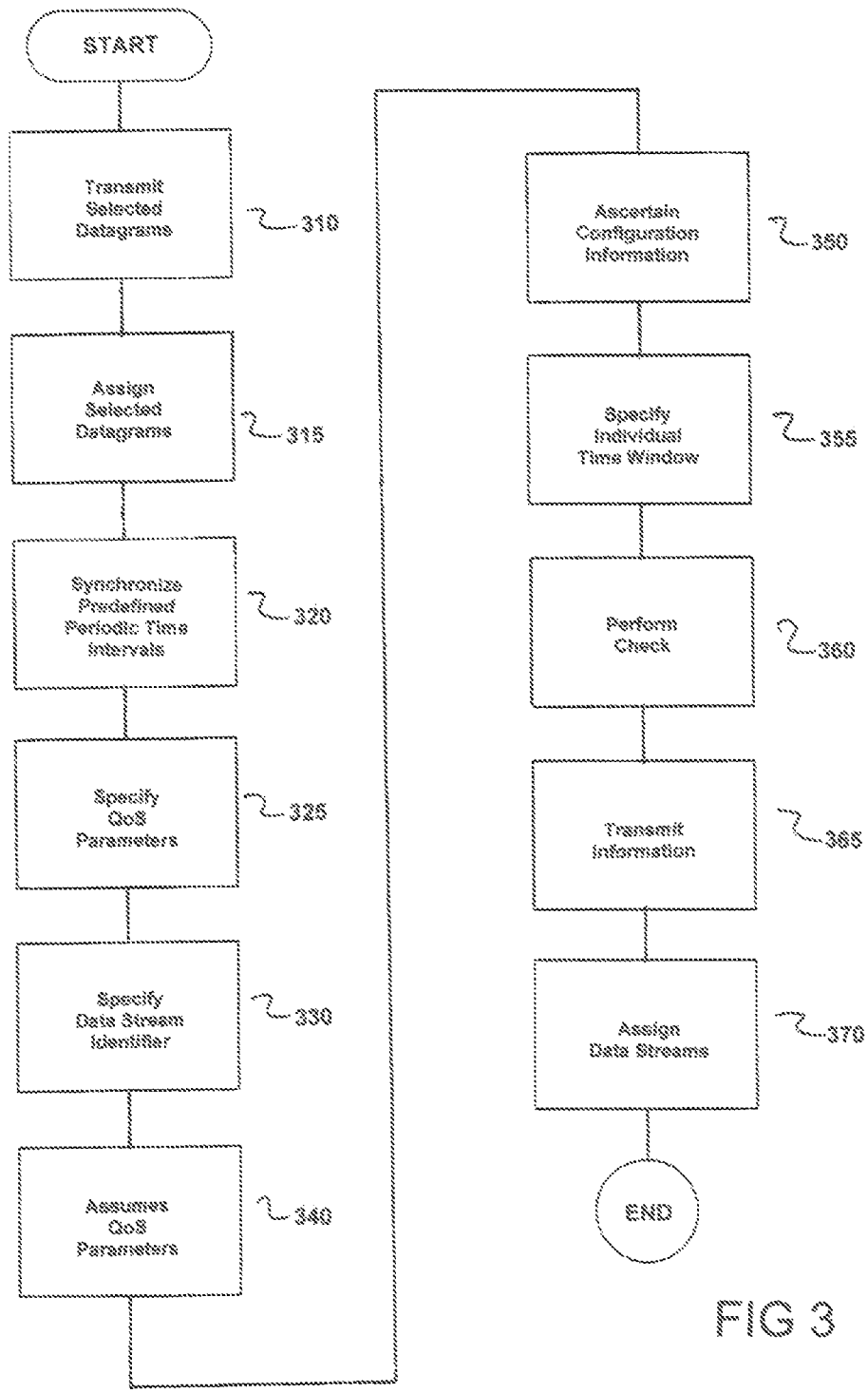
FIG. 3 is a flowchart of the method in accordance with the invention.

FIG. 3 is a flowchart of the method for operating a communication system for transmitting time-critical data. The method comprises transmitting selected datagrams 400 from first communication devices 101 at source network nodes to second communication devices at destination network nodes 102 within predefined periodic time intervals 20, as indicated in step 310.

Next, the selected datagrams are assigned to data streams and the assigned selected datagrams are transmitted via paths which comprise third communication devices 103 at intermediate network nodes, as indicated in step 315.

Next, the predefined periodic time intervals are synchronized at all network nodes, as indicated in step 320.

Next, terminals 201 connected to the first communication devices 101 specify, in each particular case, specify quality of service parameters for the data streams to reserve resources to be provided by the first and third communication devices and second communication devices, as indicated in step 325.

Next, terminals 202 connected to the second communication devices specify, in each particular case, a data stream identifier for a reservation request, as indicated in step 330.

Next, each communication device 101, 10, 103 along a path for a data stream of the data streams assumes the quality of service parameters as a basis for checking, in each particular case, in an event of a reservation request, whether sufficient resources are available in the respective communication device for data transmission while observing the specified quality of service parameters, as indicated in step 340.

Next, configuration control units of the communication devices 101, 102, 103 along a path ascertain, in each particular case, configuration information for a data stream and setting up the respective communication device for resource provision for the data streams in accordance with the ascertained configuration information if sufficient resources exist, as indicated in step 350.

Next, an individual time window 411-417 within the predefined time intervals is specified, in each particular case, for data streams assigned to selected control applications executing on the terminals 201, 202, the time windows having, in each particular case, an individual cycle duration which is a multiple of a general cycle duration or corresponds to the general cycle duration, as indicated in step 355.

Next, either the first and/or second communication devices 101, 102 check, in each particular case, for the selected control applications whether a specified time window is available for data transmission, as indicated in step 360.

Next, information about a beginning of the time window is transmitted, in each particular case, within the predefined time intervals to the terminal 201, 202 upon which the respective selected control application executes if a time window 411-417 is available, as indicated in step 365.

Next, data streams assigned to selected control applications are transmitted, in each particular case, in accordance with the information about the beginning of the individual time window, as indicated in step 370.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a communication system for transmitting time-critical data, the method comprising:
    transmitting selected datagrams from first communication devices at source network nodes to second communication devices at destination network nodes within predefined periodic time intervals;
    assigning the selected datagrams to data streams and transmitting the assigned selected datagrams via paths which comprise third communication devices at intermediate network nodes;
    synchronizing the predefined periodic time intervals at all network nodes;
    specify, by terminals connected to the first communication devices, in each particular case, quality of service parameters for the data streams to reserve resources to be provided by the first and third communication devices and second communication devices;
    specifying, by terminals connected to the second communication devices, in each particular case, a data stream identifier for a reservation request;
    assuming, by each communication device along a path for a data stream of the data streams the quality of service parameters as a basis for checking, in each particular case, in an event of a reservation request, whether sufficient resources are available in the respective communication device for data transmission while observing the specified quality of service parameters;
    ascertaining, by configuration control units of the communication devices along a path, in each particular case, configuration information for a data stream and setting up the respective communication device for resource provision for the data streams in accordance with the ascertained configuration information if sufficient resources exist;
    specifying an individual time window within the predefined time intervals, in each particular case, for data streams assigned to selected control applications executing on the terminals, the time windows having, in each particular case, an individual cycle duration which is a multiple of a general cycle duration or corresponds to the general cycle duration;
    checking, by at least one of the first and second communication devices, in each particular case, for the selected control applications whether a specified time window is available for data transmission;
    transmitting information about a beginning of the time window, in each particular case, within the predefined time intervals to the terminal upon which the respective selected control application executes if a time window is available; and
    transmitting data streams assigned to selected control applications, in each particular case, in accordance with the information about the beginning of the individual time window.

2. The method as claimed in claim 1, wherein the resources to be provided by the communication devices comprise at least one of (i) usable transfer time windows, (ii) bandwidth, (iii) assured maximum latency, (iv) number of queues, (v) queue cache and (vi) address cache in switches or bridges.

3. The method as claimed in claim 2, wherein the communication devices are connected to one another via a time-sensitive network.

4. The method as claimed in claim 3, wherein the time-sensitive network operates in accordance with at least one of (i) Institute of Electrical and Electronics Engineers (IEEE) standard 802.1Q, (ii) IEEE standard 802.1AB, (iii) IEEE standard 802.1AS, (iv) IEEE standard 802.1BA and (v) IEEE standard 802.1CB.

5. The method as claimed in claim 1, wherein the communication devices are connected to one another via a time-sensitive network.

6. The method as claimed in claim 5, wherein the time-sensitive network operates in accordance with at least one of (i) Institute of Electrical and Electronics Engineers (IEEE) standard 802.1Q, (ii) IEEE standard 802.1AB, (iii) IEEE standard 802.1AS, (iv) IEEE standard 802.1BA and (v) IEEE standard 802.1CB.

7. The method as claimed in claim 5, wherein forwarding of the selected datagrams is controlled via at least one of (i) frame pre-emption, (ii) time-aware shapers, (iii) credit-based shapers, (iv) burst limiting shapers, (v) peristaltic shapers and (vi) priority-based shapers.

8. The method as claimed in claim 7, wherein said frame pre-emption is performed in accordance with Institute of Electrical and Electronics Engineers (IEEE) standard 802.1Qbu, said time-aware shapers is performed in accordance with IEEE standard 802.1Qbv and said credit-based shapers is performed in accordance with IEEE standard 802.1Qav.

9. The method as claimed in claim 1, wherein the data streams are set up, in each particular case, bidirectionally upon reservation requests.

10. The method as claimed in claim 1, wherein a multicast address assigned to the specified data stream identifier is transmitted, in each particular case, to a requesting terminal connected to a destination network node if sufficient resources exist.

11. The method as claimed in claim 10, wherein the reservation requests are handled in accordance with Institute of Electrical and Electronics Engineers (IEEE) standard 802.1Qcc.

12. The method as claimed in claim 11, wherein the terminals connected to source network nodes each include an assigned talker function and wherein the terminals connected to destination network nodes each include an assigned listener function.

13. The method as claimed in claim 10, wherein the terminals connected to source network nodes each include an assigned talker function and wherein the terminals connected to destination network nodes each include an assigned listener function.

14. The method as claimed in claim 1, wherein the paths for the data streams are ascertained via shortest path bridging in accordance with Institute of Electrical and Electronics Engineers (IEEE) standard 802.1aq.

15. The method as claimed in claim 1, wherein at least one of the first and second communication devices, to each of which is connected a terminal on which a selected control application executes, check, in each particular case, whether a specified time window is available for data transmission.

16. A communication device, comprising:
a plurality of connections for connection to further communication devices;
a coupling element via which the connections are switchably connectable to one another;
wherein the communication device is configured to:
transmit selected datagrams from first communication devices at source network nodes to second communication devices at destination network nodes within predefined periodic time intervals, the selected datagrams being assigned to data streams and being transmitted via paths that comprise third communication devices at intermediate network nodes,
synchronize the predefined time intervals with other network nodes,
assume quality of service parameters specified for a data stream as a basis for checking, in an event of a reservation request, whether there are sufficient resources available in the communication device for data transmission while observing the specified quality of service parameters,
utilize a configuration control unit to ascertain configuration information and to set itself up for resource provision for the data streams in accordance with the ascertained configuration information,
check, in each particular case, for selected control applications whether a specified time window is available for data transmission, wherein an individual time window within the predefined time intervals is specifiable, in each particular case, for data streams assigned to selected control applications running on terminals, the time windows having, in each particular case, an individual cycle duration which is a multiple of a general cycle duration or corresponds to the general cycle duration,
transmit, in each particular case, information about a beginning of the time window within the predefined time intervals to the terminal upon which the respective selected control application executes if a time window is available, and
transmit, in each particular case, data streams assigned to selected control applications in accordance with the information about the beginning of the individual time window.

* * * * *